United States Patent [19]

Anderson

[11] 3,991,239

[45] Nov. 9, 1976

[54] TREATMENT OF SILICONE RUBBER FOR IMPROVED BONDING

[75] Inventor: William S. Anderson, Sunnyvale, Calif.

[73] Assignee: United Technologies Corporation, East Hartford, Conn.

[22] Filed: Mar. 27, 1975

[21] Appl. No.: 562,723

Related U.S. Application Data

[63] Continuation of Ser. No. 383,651, July 30, 1973, abandoned.

[52] U.S. Cl. .......................... 427/400; 260/46.5 G; 260/46.5 R; 427/322; 427/444
[51] Int. Cl.² ......................................... B05D 5/00
[58] Field of Search .......... 427/400, 444, 307, 299, 427/322; 260/46.5 G, 46.5 R; 428/447, 543; 428/643

[56] References Cited

UNITED STATES PATENTS

| | | | |
|---|---|---|---|
| 2,078,910 | 4/1937 | Merrill | 156/308 |
| 2,102,456 | 12/1937 | Brill et al. | 427/400 |
| 2,522,053 | 9/1950 | McGregor et al. | 260/46.5 |
| 2,551,344 | 5/1951 | Scholl | 204/30 |
| 3,762,978 | 10/1973 | Holmes et al. | 156/308 |

FOREIGN PATENTS OR APPLICATIONS

| | | | |
|---|---|---|---|
| 535,983 | 4/1941 | United Kingdom | 427/400 |
| 791,280 | 2/1958 | United Kingdom | 427/400 |
| 795,058 | 5/1958 | United Kingdom | 260/46.5 |

*Primary Examiner*—Harry J. Gwinnell
*Assistant Examiner*—Sadie L. Childs
*Attorney, Agent, or Firm*—Steven F. Stone

[57] ABSTRACT

Treating cured silicone rubber with bromine water etches the normally low energy surface of the silicone rubber to produce a high energy surface to which various curable polymeric systems may be directly bonded.

9 Claims, No Drawings

TREATMENT OF SILICONE RUBBER FOR IMPROVED BONDING

This is a continuation of application Ser. No. 383,651, filed July 30, 1973, now abandoned.

BACKGROUND OF THE INVENTION

It is known that both room temperature and heat curable silicone rubbers have many outstanding properties which make them desirable for industrial applications, however, such cured organopolysiloxanes are extremely difficult to bond to other materials. As a result, an extensive amount of work has been heretofore done in developing primers and other coating materials which can be applied to the surface of the organopolysiloxane to aid in bonding the polysiloxane to other material. (See, for example, U.S. Pat. Nos. 3,455,762; 3,377,309; and 3,619,256.) While some degree of success has been obtained by approaches of this nature, all such approaches have an undesirable cost impact in that they require some additional material. Unfortunately, the characteristics of silicone rubbers that make them desirable for many applications are just the same characteristics that make it difficult for other materials to be bonded to silicone rubber. Further, silicone rubbers are outstandingly resistant to corona discharges, ozone, and high temperature oxygen which are the means by which other relatively inert polymeric materials are treated to increase their surface energy and therefore their bondability to other materials. According to this invention, I have found a technique for treating the surface of silicone rubbers which raises the energy of the surface to the point where it may be bonded directly to a wide variety of liquid crosslinkable polymers and a wide variety of adhesives. The direct bond with the crosslinkable polymers is extremely useful in rocket motor applications and the availability of a wide variety of adhesives will permit a greater choice of materials which may be bonded to the silicone rubber by the adhesives.

It is accordingly an object of this invention to provide a method for treating the surface of a silicone rubber to produce a high energy surface.

It is another object of this invention to provide a method for treating silicone rubbers that improves the bondability of the rubber with a wide variety of materials.

These and other objects of this invention will be readily apparent from the following description of the invention.

DESCRIPTION OF THE INVENTION

Broadly stated, this invention contemplates the raising of the energy of the surface of a silicone rubber by treating the silicone rubber with an aqueous solution of a halogen. The preferred halogen is bromine because its characteristics of solubility in water and reactivity at ambient temperatures fortuitously result in a system which activates the surface of silicone rubbers at rates which are neither too fast nor too slow. In addition, bromine has the advantage of ready storability as an element in the liquid state. Thus, while other halogens may be used if the reaction conditions are adjusted to account for the different degrees of reactivity, this invention will be hereafter described with respect to aqueous solutions of bromine which, for the above reasons, are the preferred embodiments.

This invention is usable with a wide variety of silicone elastomers including graft and block copolymers containing polydimethylsiloxane sequences. The preferred substrates are silicones containing phenyl-Si linkages; these are attacked most rapidly by bromine water yielding brombenzene and a hydroxyl-containing polymer surface. The silicones may either be unfilled or may contain typical fillers such as silica, graphite, glass, boron, silicon carbide and organic particulates or fibers.

The treatment of the silicone rubber surface, according to this invention to increase its energy level, improves the bondability of the silicone rubber with a wide variety of liquid crosslinkable rubbers such as functionally active polybutadienes, polyisobutylenes, polybutadiene-acrylic acid-acrylonitrile-copolymers, as well as a wide variety of adhesive materials such as the polyurethane epoxy, phenolic, unsaturated polyester, melamine-formaldehyde, urea-formaldehyde, alkyd resin, polysulfide, polyaziridine, polyvinyl acetal and cyanoacrylate adhesives, as well as animal and vegetable glues such as casein and hot-melt adhesives. The availability of a wide variety of adhesives will permit the silicone rubbers to be bonded to a wider range of organic and inorganic materials than can now be attained by choosing an appropriate adhesive system which is now known to bond to the material but could not heretofore be bonded to a silicone rubber.

According to the preferred procedure of this invention, the silicone rubber surface is treated in an aqueous solution of bromine at room temperature for 0.1 to ten hours, then is thoroughly washed with water and dried at elevated temperatures. When the silicone rubber surface has been activated to the point where it is usable according to this invention, the original hydrophobic and unreceptive surface becomes wettable with water, receptive to organic dye, such as crystal violet, and absorbent in the infrared at 3400 cm$^{-1}$ (attenuated total reflectance, ATR). Thus, a worker skilled in the art can readily determine the conditions necessary for treatment of a wide variety of silicone rubbers according to this invention, by measuring the infrared spectrum of the treated surface, the attraction which the treated surface shows for water, or by observing the affinity which the treated surface shows for organic dyes.

EXAMPLE 1

Discs of Dow Corning 93-104 silicone rubber 0.063 inches thick were mounted on cylindrical steel bases 1.5 inches in diameter. The surfaces of the silicone rubber discs were lightly sandpapered, wiped with toluene and dried overnight in air at 200° F. The silicone rubber specimens were then immersed in a saturated solution of bromine in water for varying lengths of time, washed with water and again dried in air at 200° F. A cylinder of a filled rubber having a matrix of hydroxy functional polybutadiene cured with dimeryl diisocyanate was cast against the silicone rubber surfaces and allowed to cure three days at 140° F and two days at 160° F. Tension was applied perpendicular to the silicone-to-polybutadiene interface by drawing the samples at 0.2 inch/minute at 72° F in an Instron tensiometer. In this test of tensile strength, untreated samples of silicone separate cleanly from the polybutadiene showing that the silicone-to-polybutadiene bonding is much lower in tensile strength than either the polybutadiene or the silicone rubber. However, silicone samples treated with bromine water for several hours bond well enough to the polybutadiene containing material to produce a bond stronger than the polybutadiene-containing material itself and such samples break primarily within the polybutadiene mass. Results of these tests are summarized in Table 1.

TABLE I

| Bromine Water Treatment, Hours[a] | Breaking Stress, psi Polybutadiene-to-Silicone Bond | Type of Break |
|---|---|---|
| 0 | 39.5 | adhesive failure |
| 1 | 64.2 | cohesive failure in polybutadiene |
| 3 | 76.0 | cohesive failure in polybutadiene |
| 5 | 93.3 | cohesive failure in polybutadiene |

[a]Silicone surface in a saturated solution of bromine in water at room temperature.

EXAMPLE II

A sheet of Silastic 955 silicone rubber 2 mm in thickness, a product of Dow Corning Corporation, was immersed in saturated bromine water for 10 hours at 23° C, then thoroughly rinsed with distilled water and dried at 130° C. An attenuated total reflectance spectrum on the elastomer shows strong absorption at 3400 cm$^{-1}$, a frequency attributable to the presence of hydroxyl groups in the elastomer surface. Two pieces of thus treated rubber may be cemented together by the use of a standard room temperature curing epoxy resin formulation such as Hardman Extra Fast Setting Epoxy.

It is readily apparent from the above examples that treatment of the surface of silicone rubber with bromine water substantially improves the bondability of the surface and that the bondability increases with the duration of treatment. Thus, even some treatment, according to this invention, is better than none and the experimental results indicate that the surface energy of the silicone rubber increases gradually with time and tends to level off after approximately five or six hours at room temperature. Obviously, raising the temperature will increase the rate of reaction and lowering the temperature will decrease the rate.

It should be noted that aqueous halogen solutions usable according to this invention need not be formed by the direct dissolving of the halogen in water. Suitable solutions can be obtained by the mixing of relatively inert aqueous solutions of halides and halates such as sodium bromide and sodium bromate to form the aqueous halogen solution in situ. The pH of the halogen solution can be adjusted by addition of a hydroxide such as NaOH. Such higher pH solutions are advantageous because higher halogen concentration can be obtained, corrosive effects on metallic substrates for the silicone rubber are reduced and the light sensitivity of the solutions is reduced. Mixed halogen solutions can also be prepared from, for example, sodium chloride and sodium bromate or sodium bromide and sodium chlorate. Accordingly, it is contemplated that the aqueous halogen solution described herein can be produced by the above approaches as well as by direct solution of halogens.

While the utility of the invention has been discussed with respect to improving the bondability of silicone rubbers, it is readily apparent that increasing the surface energy of a silicone rubber is useful in a wide variety of other applications. Silicone rubbers are used for surgical tubing with which a Heparin treatment is required to prevent clotting and this invention may be useful in preparing the tubing for such treatment. Increasing the surface energy also renders the silicone rubber surface more receptive for dyes and inks permitting printing, for example. Silicone rubbers are also used as semi-permeable membranes where the higher surface energy produced by this invention will increase the wettability and the oxygen permeability.

Although this invention has been described with respect to a specific embodiment thereof, it should not be construed as being limited thereto. Various modifications may be made without departing from the scope of this invention which is limited only by the following claims wherein:

I claim:

1. A method for treating silicone rubber to increase the surface energy thereof which comprises exposing the surface of said rubber to an aqueous halogen solution under conditions of time, temperature and concentration sufficient to generate hydrophilic polar sites on the surface of said silicone rubber.

2. A method of claim 1 wherein the halogen is bromine.

3. The method of claim 2 wherein the silicone rubber contains phenyl-Si linkages.

4. The method of claim 2 further comprising the steps of washing the treated surface with water and drying the surface.

5. The method of claim 4 wherein the silicone rubber contains phenyl-Si linkages.

6. The method of claim 1 wherein the surface of the rubber is exposed to the halogen solution for a period of time sufficient to render said surface wettable with water.

7. The method of claim 1 wherein the surface of said rubber is exposed to the halogen solution for a period of time sufficient to cause the surface to become absorbent in the infrared at 3400 cm$^{-1}$.

8. The method of claim 2 wherein the surface of the rubber is exposed to the halogen solution for a period of time sufficient to render said surface wettable with water.

9. The method of claim 2 wherein the surface of said rubber is exposed to the halogen solution for a period of time sufficient to cause the surface to become absorbent in the infrared at 3400 cm$^{-1}$.

* * * * *